United States Patent
Gounalis

(10) Patent No.: US 7,791,526 B2
(45) Date of Patent: Sep. 7, 2010

(54) DETERMINING SCAN STRATEGY FOR DIGITAL CARD

(75) Inventor: Anthony J. Gounalis, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 66 days.

(21) Appl. No.: 12/181,695

(22) Filed: Jul. 29, 2008

(65) Prior Publication Data

US 2010/0027715 A1 Feb. 4, 2010

(51) Int. Cl.
G01S 7/40 (2006.01)
G01S 7/285 (2006.01)
G01S 7/35 (2006.01)
G01S 13/00 (2006.01)

(52) U.S. Cl. .................... 342/13; 342/20; 342/89; 342/175; 342/195

(58) Field of Classification Search ............. 342/13–20, 342/89, 118, 128, 133, 134, 139, 146, 147, 342/158, 175, 195, 165, 173; 455/130, 150.1, 455/161.1–169.2; 702/1, 57, 66, 75, 76, 702/77, 127
See application file for complete search history.

(56) References Cited

U.S. PATENT DOCUMENTS

| | | | |
|---|---|---|---|
| 5,854,601 A | 12/1998 | Kenefic | |
| 6,147,646 A | 11/2000 | Arneson et al. | |
| 6,177,902 B1 | 1/2001 | Huntley et al. | |
| 6,313,781 B1 | 11/2001 | Lee | |
| 6,765,522 B2 | 7/2004 | Greer | |
| 6,831,589 B2 | 12/2004 | Shearer | |
| 6,842,137 B2 | 1/2005 | Gounalis | |
| 6,859,160 B1 * | 2/2005 | Gounalis | 342/13 |
| 6,859,161 B1 | 2/2005 | Bricker et al. | |
| 6,873,284 B2 | 3/2005 | Gounalis | |
| 6,894,634 B2 | 5/2005 | Gounalis | |
| 6,894,635 B2 | 5/2005 | Gounalis | |
| 6,917,325 B2 | 7/2005 | Gounalis | |
| 6,989,780 B2 * | 1/2006 | Gounalis | 342/13 |
| 7,034,738 B1 | 4/2006 | Wang et al. | |
| 7,038,611 B2 | 5/2006 | Gounalis | |
| 7,068,209 B2 | 6/2006 | Gounalis | |
| 7,109,909 B2 | 9/2006 | Gounalis | |
| 7,148,835 B1 | 12/2006 | Bricker et al. | |
| 7,176,826 B2 | 2/2007 | Gounalis | |
| 7,193,555 B2 | 3/2007 | Gounalis | |
| 7,236,119 B2 * | 6/2007 | Gounalis | 342/20 |

(Continued)

OTHER PUBLICATIONS

Mathews, B.D., "Optimal dwell time for approach-warning radar," Aerospace and Electronic Systems, IEEE Transactions, Apr. 2005.

(Continued)

*Primary Examiner*—Bernarr E Gregory
(74) *Attorney, Agent, or Firm*—Wolf, Greenfield & Sacks, P.C.

(57) ABSTRACT

A method is provided for determining a scan strategy to receive data for a digital unit associated with an electronic support measure receiver. The receiver scans a surrounding environment to detect and receive emitted signals while utilizing the digital unit to improve emitter identification. The digital unit is provided with the data according to requirements of digital signal processing algorithms implemented by the unit.

20 Claims, 5 Drawing Sheets

U.S. PATENT DOCUMENTS

| | | | | |
|---|---|---|---|---|
| 7,248,203 | B2* | 7/2007 | Gounalis | 342/13 |
| 7,348,919 | B2 | 3/2008 | Gounalis | |
| 7,358,887 | B2* | 4/2008 | Gounalis | 342/20 |
| 7,482,967 | B2* | 1/2009 | Beharrell | 342/20 |
| 2004/0113831 | A1* | 6/2004 | Gounalis | 342/13 |
| 2004/0113832 | A1* | 6/2004 | Gounalis | 342/13 |
| 2004/0116090 | A1* | 6/2004 | Gounalis | 342/13 |
| 2004/0117139 | A1* | 6/2004 | Gounalis | 702/76 |
| 2004/0119630 | A1* | 6/2004 | Gounalis | 342/13 |
| 2004/0130476 | A1* | 7/2004 | Gounalis | 342/13 |
| 2004/0130477 | A1* | 7/2004 | Gounalis | 342/13 |
| 2004/0130478 | A1* | 7/2004 | Gounalis | 342/14 |
| 2004/0133380 | A1* | 7/2004 | Gounalis | 702/127 |
| 2004/0135717 | A1* | 7/2004 | Gounalis | 342/13 |
| 2005/0052311 | A1* | 3/2005 | Gounalis | 342/13 |
| 2005/0052312 | A1* | 3/2005 | Bricker et al. | 342/13 |
| 2006/0077096 | A1 | 4/2006 | King et al. | |
| 2006/0097904 | A1* | 5/2006 | Gounalis | 342/13 |
| 2006/0176208 | A1* | 8/2006 | Gounalis | 342/13 |
| 2006/0227035 | A1* | 10/2006 | Gounalis | 342/13 |
| 2007/0080847 | A1* | 4/2007 | Gounalis | 342/13 |
| 2007/0090988 | A1* | 4/2007 | Beharrell | 342/13 |
| 2007/0222673 | A1* | 9/2007 | Gounalis | 342/165 |
| 2008/0169959 | A1 | 7/2008 | Gounalis | |
| 2008/0219322 | A1 | 9/2008 | Hanna et al. | |

OTHER PUBLICATIONS

Ramesh, A.A. et al., "Important of receiver dwell time in emission measurements," Proceedings of the International Conference on Electromagnetic Interference and Compatibility, Dec. 6-8, 1999.

Schaefer W., "Signal detection with EMI receivers," Proceedings of the 1998 IEEE International Symposium on Electromagnetic Compatibility, Aug. 24-28, 1998.

Vejlgard B.N. et al., "Adaptive threshold settings in code phase acquisition for the double dwell architecture," Proceedings of the 2000 IEEE 51$^{st}$ Vehicular Technology Conference, May 15-18, 2000.

Ward, P.W., "GPS receiver search techniques," Proceedings of Position, Location and Navigation Symposium—PLANS '96, Apr. 22-26, 1996.

Zhou, Y. et al., A hybrid approach to modulation recognition for intentional modulation on pulse (IMOP) applications, Defense R & D, Ottawa, Canada, May 2006.

* cited by examiner

DETERMINING SCAN STRATEGY FOR DIGITAL CARD

FIELD OF INVENTION

The present invention relates to determining scan strategy for an Electronic Support Measures (ESM) receiver utilizing digital signal processing technology.

DISCUSSION OF RELATED ART

Electronic Support Measures (ESM) receivers are receivers used to detect, identify, and/or locate emitted electromagnetic signals. Such signals may have different signal characteristics (e.g., pulse width and pulse repetition interval) and may be transmitted by a variety of emitters that transmit in different portions of the frequency spectrum. Thus, it may be desired to use an ESM receiver to detect signals across a wide range of frequencies.

Detection systems exist for detecting signals generated by emitters which are of interest. For example, Electronic Support Measures/Electronic Intelligence (ESM/ELINT) systems are used for conducting surveillance (e.g., radar, and other signals across a wide range of the frequency spectrum). These systems detect one or more signals produced by emitters operating in different modes. For example, certain signals may have particular signatures that are indicative of certain types of emitters. Such signals may be detected and then categorized and classified using an emitter library to determine, for example, emitter type and function. The "signals of interest" are chosen a priori to compile the emitter library which contains known emitter signatures and parameters used to detect the respective emitters. Mission planning includes determining emitters expected to be present in the electromagnetic environment, their characteristics, and processing and capacity limitations of the detecting system.

Typically, receiver resources available to detect emitters in the environment are limited. Therefore, uniform detection of multiple emitters in the environment may be degraded, and detection of some emitters may not be possible. However, there is a need to scan the environment while utilizing receiver resources in an efficient manner to detect as many emitters as possible. Furthermore, the majority of the receivers used are analog receivers. Some limitations exist on parameters that can be measured on analog signals and their measurement quality.

SUMMARY OF INVENTION

According to one aspect of the invention, a method for determining a scan strategy for allocating resources of an electronic support measure receiver in a system employing at least one digital signal processing algorithm to identify at least one emitter is provided. The method comprises obtaining at least one intercept requirement for the at least one digital signal processing algorithm, determining at least one scan strategy based at least in part on the at least one intercept requirement to receive electromagnetic signals from the at least one emitter for input to the at least one digital signal processing algorithm, adjusting the at least one intercept requirement to provide at least one tuned scan strategy so that the at least one digital signal processing algorithm can be successfully executed on the electromagnetic signals received using the at least one tuned scan strategy, and storing the at least one tuned scan strategy.

According to another aspect of the invention, a computer-readable medium encoded with computer-executable instructions that, when executed by a computer, instruct the computer to perform a method for determining a scan strategy for allocating resources of an electronic support measure receiver in a system employing at least one digital signal processing algorithm to identify at least one emitter is provided. The method comprises obtaining at least one intercept requirement for the at least one digital signal processing algorithm, determining at least one scan strategy based at least in part on the at least one intercept requirement to receive electromagnetic signals from the at least one emitter for input to the at least one digital signal processing algorithm, adjusting the at least one intercept requirement to provide at least one tuned scan strategy so that the at least one digital signal processing algorithm can be successfully executed on the electromagnetic signals received using the at least one tuned scan strategy, and storing the at least one tuned scan strategy.

According to yet another aspect of the invention, a system for determining a scan strategy for receiving signals from a surrounding environment by an electronic support measure receiver for input to at least one digital signal processing algorithm to identify at least one emitter is provided. The system comprises a processing module for performing a method of obtaining at least one intercept requirement for the at least one digital signal processing algorithm, determining at least one scan strategy based at least in part on the at least one intercept requirement to receive electromagnetic signals from the at least one emitter for input to the at least one digital signal processing algorithm, adjusting the at least one intercept requirement to provide at least one tuned scan strategy so that the at least one digital signal processing algorithm can be successfully executed on the electromagnetic signals received using the at least one tuned scan strategy, and storing the at least one tuned scan strategy.

DETAILED DESCRIPTION

Figure 1:
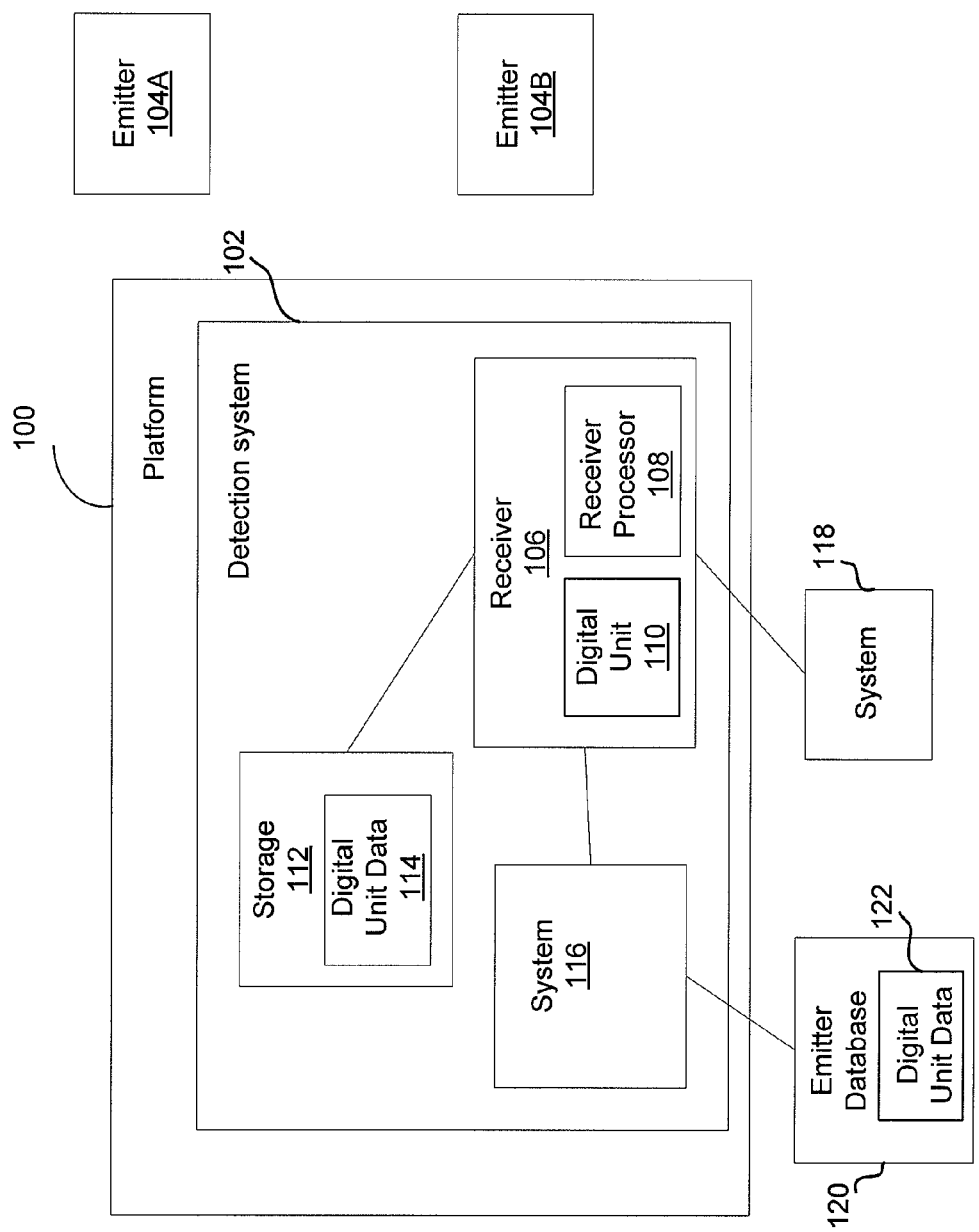
FIG. 1 is a diagram of an illustrative platform in which some embodiments may be implemented.

The applicants have recognized that the capabilities of existing receivers can be expanded by supplementing them with digital technology. Emitter identification using conventional receivers may not provide a unique emitter and/or emitter operating mode identification. Moreover, analog receivers may not be sensitive enough to detect certain signals in the environment. For example, low power signals may not be detected.

Functionality of a conventional receiver may be extended by employing components implementing digital signal processing techniques. An example of such a component may be a digital card or circuit that may be added to an ESM system to work with the host receiver. This may result in increasing a number of parameters measured on intercepted signals and therefore improve emitter identification. Therefore, ambiguities with respect to unique emitter identification or emitter operating mode may be resolved. Further, the digital signal processing techniques may allow detecting emitters that are not detected by analog receivers.

A digital signal processing component employed by a conventional ESM system may be a digital unit appended to or otherwise associated with a host receiver of the system. The digital unit may implement one or more signal processing algorithms. The digital unit may be, for example, a digital card that measures and evaluates Intentional Modulation on Pulse (IMOP) characteristics of intercepted signals and is referred to as an IMOP card. The IMOP card may improve the emitter detection and identification by expanding the existing functionality of the receiver. In the environment where multiple emitters are operating, a receiver employing the IMOP card may detect signals that are not detected by the receiver alone. Therefore, IMOP cards may allow enhancing situational awareness while maintaining efficient utilization of existing technologies.

Furthermore, an IMOP card may implement an analysis referred to as a high sensitivity detection (HSD) analysis. Such analysis may be implemented by a separate digital unit that may be referred to as HSD card. A traditional assumption exists that the sensitivity of the HSD technology is such that the detection can be made whenever the card implementing the analysis operates and "looks" or "listens" for a signal. Thus, it is assumed that the sensitivity is such that the entire antenna radiation pattern (e.g., main beam, major side lobes, minor side lobes and back lobes) are visible at any reasonable range. The typical implementation of HSD technology involves using arrays of HSD cards "listening" to different frequency ranges which may be costly in terms of hardware. Moreover, some emitters use power reduction technology that interferes with an ability to detect the radiation pattern which may negate in part or entirely the assumption on the sensitivity of the HSD technology. The applicants have appreciated that the HSD technology may be utilized within an IMOP card, as discussed below. Thus, a number of hardware resources required to perform the HSD analysis may be reduced.

The applicants have appreciated that the functionality of a digital unit may be exploited in an efficient manner by acquiring data for the digital unit in accordance with characteristics of the unit. The characteristics may include, for example, requirements of algorithms implemented by the unit, hardware parameters of the unit, and description of input data to be provided to the unit. Functionality of digital units may be exploited efficiently when timing of data acquisition for each emitter and/or emitter operating mode is determined and adjusted according to characteristics of analyses performed by the units and specifics of emitters being detected and identified.

Targeting data collection by a receiver toward the requirements of the analyses performed by the digital unit may increase the capacity of the receiver thus extending receiver scan capabilities. Furthermore, receiver performance can be improved by developing data acquisition schemes specific to analyses performed by the digital unit. This may allow detecting emitter signals which may otherwise be detected with undesirable latency or not be detected at all. The receiver resources may then be allocated in a manner that achieves desired analysis responsiveness per emitter while increasing number of possible simultaneous analyses and decreasing an impact on scan strategy of the analog receiver. The receiver resources may therefore be utilized in an optimal way which may allow improved detection of multiple emitters in the scanned environment.

To enable detection of emitters by ESM systems, global emitter databases that contain information on known emitters are created and maintained. An emitter may be defined as an energy radiating source that may have more than one mode of operation. The databases may be generated offline and stored in any suitable location. A global emitter database may include emitter characteristics, platform characteristics and other information. Further, the global database may be subdivided into regions or segments. An emitter database may include, for each emitter, its description (e.g., a manufacturer, a model, an antenna type, use, etc.) and a set of signature parameters (e.g., a transmit power, scanning method used, a scan rate, a pulse width, a pulse repetition interval, etc.). The emitter database may also include multiple emitter operating modes of each emitter, which are represented as unique signatures linked together within the emitter database description. Further, the database may include intercept requirements for each emitter and other related information.

To detect emitters in an environment, emitters in the global emitter database or a subset thereof may be selected and dwell parameters may be determined for these selected emitters. Thus, given some desired expectations of signal interception and known emitter parameters, the receiver may be directed to handle as many emitters as possible in terms of quality (e.g., successful emitter identification) and responsiveness (e.g., allocating a minimum time required to detect a signal and/or perform one or more analyses on the signal). These parameter selection processes may be performed offline, prior to a mission, during which the results of the processing are utilized to detect the emitters.

A dwell generally defines scan resource solution(s) that meet one or more emitter intercept requirements for emitter detection. A dwell may define a receiver configuration to detect the one or more emitters that the receiver is designed to detect. Parameters such as, for example, a frequency range which the dwell is intended to cover, a dwell duration (i.e., the amount of time the receiver spends tuned to that frequency range), a revisit time (i.e., how often the dwell is executed) and others may define a dwell. The dwell solution may be constrained by one or more constraints, if any. The constraints may be based on knowledge of the environment to be scanned. A dwell may be broadly characterized as either an acquisition dwell or an analysis dwell. Acquisition dwells are dwells which are executed to scan the environment within a certain frequency range to detect anticipated emitter signals. Signal detection by acquisition dwells is statistical and intercept performance may be a function of the spectrum sampling rate. Analysis dwells may be referred to as "timed dwells", which are dwells which attempt to collect signal data at specific time intervals following signal acquisition. Examples of analysis dwells may be phase modulation analysis dwells, scan type determination dwells, scan modulation analysis dwells, as well as dwells of other types created to collect specific information on emitters that may not be readily available upon detection performed using acquisition dwells. Analysis dwells may also be created in response to an operator request.

The information on the selected subset of emitters, the dwell parameters and other related information may be stored in an entity referred to as an emitter library. The emitter library may be stored, for example, in memory of any suitable system and may be provided to a detection system on a platform (e.g., an aircraft) performing a mission. The emitter library may be generated, for example, in a form of an information matrix. Scan strategies each used to detect at least one emitter may be extracted from information (e.g., the information matrix) included in the emitter library. A scan strategy is defined by one or more dwells and describes how the receiver's resources may be utilized for the emitter detection. The scan strategies may be computed offline and stored within or otherwise associated with the emitter library.

The emitter library and the scan strategies (which may be part of the emitter library) may be provided to an ESM system. In operation (e.g., during a mission), the ESM system can detect emitter signals by executing acquisition dwells and creating and executing analysis dwells. The acquisition dwells may be defined in a scan strategy that is generated (e.g., a priori) to identify a selected set of emitter parameters. The system analyzes the detected signals and matches the results against emitter information stored in the emitter library. The analysis dwells may be created based on environment conditions in the scanned region (e.g., in a form of constraints) to either resolve ambiguities that remain after an emitter detection using acquisition dwells or to collect additional specific data.

As discussed above, conventional analog receivers have certain limitations. To improve identification of emitters in the scanned environment, a unit implementing a set of analyses may be added to a receiver. The unit may be, for example, a digital unit performing a set of digital signal processing analyses. However, an efficient utilization of resources of a receiver may not be achieved if data provided to the digital unit for analysis is collected in the environment using a data acquisition scheme computed for the analog receiver.

Analyses performed by the digital unit may have different requirements with respect to the data collection. For example, while one or a few data samples may be sufficient for some analyses, a substantially larger number of data samples may be required for others. Therefore, acquiring the data in accordance with the requirements of the analyses may provide an efficient utilization of receiver resources, which may increase a number of analyses that can be executed simultaneously and improve system throughput. Hence, emitter identification may be improved, which may include successful multiple emitter identification. Therefore, some embodiments of the invention implement a method for determining scan strategies and other information tailored for different types of analyses provided by the digital unit operating in association with the analog receiver. In these embodiments, the global emitter database may be supplemented with information required to efficiently use the digital unit. The information may comprise intercept rules for each of the analyses performed by the digital unit.

Emitters in the global emitter database generated according to some embodiments of the invention may be selected and dwell parameters may then be determined for these emitters. The emitters may be selected as part of mission planning where certain emitters are expected to be detected in the environment to be scanned during the mission. The dwell definition may include dwell parameters for collecting data to be provided to the digital unit. Information on the selected emitters and the dwell parameters may be stored in an emitter library, as discussed above. The information may include dwells used to tune the receiver for each emitter and one or more of its operating modes for each type of the analyses performed by the digital unit.

Embodiments of the invention provide a method and a system for utilizing receiver resources efficiently such that multiple emitters may be detected and identified in the scanned environment. To implement this method, intercept rules may be defined to determine how emitters may be detected by a detection system while satisfying requirements of the analyses implemented by a digital unit and scanning requirements for each emitter. In particular, the system may determine, for each emitter, within what elapsed time period (i.e., intercept time) and within what range the signal produced by the emitter may be intercepted. Also, the system may determine how often to sample for incoming signal to achieve an acceptable intercept time. If an emitter has more than one mode of operation, an intercept rule may be defined per emitter mode.

In some embodiments of the invention, an intercept rule may be determined to specify at within what range (Range) from the receiver the emitter is expected to be detected, a probability of intercept of the emitter (Pd), and a response time period (RT) within which the analysis results may be required after an initial emitter detection. It should be appreciated that other rules per emitter mode may be defined as embodiments of the invention are not limited in this respect. The intercept rules may be specified by a user and are used to allocate receiver resources for identification of emitters of interest in an efficient manner.

In some embodiments of the invention, parameters included in the intercept rules may be adjusted to optimize characteristics of dwells to be executed to collect data for the analyses performed by the digital unit. The intercept rules and the dwell parameters may then be stored for a mission planning use or any other suitable use. Thus, embodiments of the invention provide a method of extending functionality of a conventional receiver of an ESM system employing a digital unit by computing parameters for collecting data to be used by the digital unit. This improves intercept performance of the system. Resources of the receiver may be utilized efficiently which may improve emitter identification in the environment.

According to some embodiments of the invention, the emitter library comprising information related to the digital unit may be used to extract a scan strategy. The scan strategy may be generated based at least in part on hardware parameters of the digital unit, emitter characteristics and parameters of the algorithms implemented by the digital unit. Mathematical modeling techniques may be used to determine the scan strategy accounting for solution limitations, such as, for example, environmental constraints. The scan strategy may then be evaluated to measure its performance.

The digital unit such as, for example, an IMOP card, may perform several analyses on intercepted signals. The analyses may provide improved emitter identification. For example, the analog receiver may determine the kind of an emitter by matching the detection to the signature library and may, for example, identify the host platform as airborne or submarine. The IMOP card analyses may provide further details on the emitter, which may resolve ambiguities between overlapping signatures in the library. For example, in some embodiments, one analysis may identify a class of the emitter. Another analysis may provide further identification details on the emitter and recognize a particular unit comprising the emitter (e.g., a serial number or other specific identification information on the unit). Also, a sensitivity of the IMOP may be utilized in a form of an analysis that can permit detecting signals not detected by the analog receiver.

Each of the analyses implemented in the IMOP card may be characterized by a set of parameters which can be taken into consideration in developing a data collection scheme for the analysis in an efficient way. An analysis may be defined as a set of algorithms which may be implemented in software, firmware, hardware or in any suitable combination thereof. It should be appreciated that the IMOP card is described by way of example only as embodiments of the invention are not limited to any specific unit utilized along with the receiver. Any suitable unit may be substituted provided that characteristics of the analyses performed by the unit, inputs and outputs and other suitable parameters of the unit may be identified.

FIG. 1 is a diagram of an illustrative platform 100 in which some embodiments may be implemented. Platform 100 includes a detection system 102 that scans a surrounding environment and detects signals transmitted by one or more emitters 104A-104B. These signals may be, for example, electromagnetic signals transmitted in any number of frequencies, including radar, communication, and other types of signals. Detection system 102 may be implemented using any suitable components implemented in hardware, software, or a combination thereof. Detection system 102 may employ an operating flight program (OFP) or any other suitable software used by the system during a mission.

Detection system 102 may include at least one receiver 106 of any suitable type, such as, for example, an ESM receiver. In one embodiment, the receiver may be capable of detecting one or several intermediate frequency (IF) bandwidth and video bandwidth (VBW) combinations with varying sensitivity. Receiver 106 may scan the environment (e.g., using a scan strategy or in any other suitable way) to detect signals of various frequency ranges. To detect signals of different frequency having different signal characteristics, receiver 106 may execute a series of dwells, which is a series of configurations of the receiver allowing it to tune to different frequencies and to detect signals having different frequency characteristics.

Received signals may be passed to receiver processor 108. In one embodiment of the present invention, receiver processor 108 receives and processes the signals and implements a scan strategy. In particular, processor 108 may detect one or more emitters 104A-104B by observing frequency bands defined by the scan strategy. This scan strategy may be provided, for example, by one or more systems 116 and 118. It should be appreciated that the scan strategy may be determined (e.g., offline) within any suitable system as embodiments of the invention are not limited in this respect.

In embodiments of the present invention, at least one digital unit 110 may be inserted into or otherwise associated with receiver 106 to expand the functionality of the receiver. For example, in one embodiment, the digital unit is inserted into receiver 106 as a "daughter" card. Performance of the card may be controlled by receiver processor 108. Digital unit 110 may comprise at least a digitizer and a digital signal processor (not shown). In some embodiments, digital unit 110 may be a digital card that implements IMOP techniques and is referred to as an IMOP card. As discussed above, the IMOP card allows detection system 102 to measure additional parameters and detect more information than can be detected using the analog receiver. The IMOP card may improve detection of any suitable emitters. For example, the IMOP card may detect emitters that emit intra-pulse modulated signals and which may not be detected using conventional analog receivers. The IMOP card may decode such signals and match them against an emitter library, as discussed below.

Some embodiments of the invention provide a method of determining dwell parameters that allow collecting data in the environment for the digital unit in such a way that resources of the receiver are utilized efficiently. The dwell parameters may be determined by system 116 (e.g., system 116 may form part of detection system 102) or by a system 118 external to detection system 102. Processing systems 116 and 118 may provide an evaluation of the dwell parameters, to determine whether each signal of interest is detected within defined constraints. The dwell parameters may be adjusted to satisfy the constraints. A scan strategy may be derived from the dwell parameters, either offline or during a mission. It should be appreciated that embodiments of the invention may be implemented in a computer system such as systems 116, 118 or any other suitable system.

As shown by way of example in FIG. 1, detection system 102 includes storage 112 that may comprise any suitable information required for detecting emitters in the environment. Thus, storage 112 may store an emitter library and a scan strategy which may be generated offline and loaded on platform 100 performing a mission. Storage 112 may include both data obtained using known technologies as well as information provided by some embodiments of the invention. It should be appreciated that storage 112 may be part of system 116 or any other suitable system or component and is shown separately by way of example only.

FIG. 1 illustrates that storage 112 comprises digital unit data storage 114 that stores data associated with digital unit 110. It should be appreciated that digital unit data storage 114 is shown as a separate component of storage 112 by way of example only and any suitable component(s) can be used to store information associated with digital unit 110. In embodiments of the invention employing an IMOP card as a digital unit 110, digital unit data storage 114 may store dwell parameters for collecting data suitable for input to the IMOP card. The dwell parameters may be part of an emitter library (e.g., an information matrix) and may be used during a mission to create analysis dwells for the analyses of the IMOP card. Also, a scan strategy may be extracted which is a set of dwells (e.g., acquisition dwells) to be executed during a mission. The dwell parameters defined specifically for the digital unit 110 may be used to intercept signals in the environment and provide them to digital unit 110 such that the functionality of the digital unit is utilized efficiently.

The information stored in storage 112 may be obtained, for example, from a global emitter database 120 that may be located in any suitable component (e.g., in system 118). Global emitter database 120 may comprise information on known emitters, including emitter parameters and intercept requirements. In some embodiments of the invention, the global emitter database may also comprise information required for efficient utilization of a digital unit. FIG. 1 illustrates, by way of example only, that emitter database 120 may includes digital unit data 122 which may store the information which may include, for example, intercept requirements for collecting data suitable for analyses implemented by the digital unit.

Embodiments of the invention provide a method of processing the information from the global emitter database by selecting emitters to be detected and creating, along with dwell parameters for emitter detection and identification performed by the conventional analog receiver, dwell parameters to collect data for the analyses performed the digital unit (e.g., an IMOP card). The processed information may be stored as an "information matrix" which is an N by M matrix that models emitters (N) and the potential solutions for their detection (M). As discussed above, constraints may also apply to this N×M information matrix. Based on the emitter and constraint (if necessary) inputs, dwell parameters may be computed for each selected emitter database entry (N inputs). This computation may be performed for every possible receiver tuning configuration (e.g., IF/VBW combination), yielding several potential solutions per emitter database entry (M). The information matrix may be stored, for example, in storage 112 or outside of platform 110 (e.g., in system 118 or in any other suitable entity). In some embodiments of the invention, the dwell parameters for analyses of the digital card may also be stored in storage 112, system 118 or in any other suitable entity.

As discussed above, the information matrix may be used to extract a scan strategy for detecting at least one emitter that can operate in one or more modes. A mathematical modeling may be used to determine the scan strategy. The scan strategy may be stored in a scan strategy library, as discussed in more detail below. In some embodiments of the invention, the scan strategy library may comprise a scan strategy defining dwell parameters for collecting data for one or more of the analyses performed by the digital unit. This scan strategy defining dwell for the digital unit, implemented in some embodiments of the invention, may be determined using information on hardware parameters of the digital unit as well requirements of the analyses performed by the digital unit.

The dwell parameters for collecting data to be provided to the digital unit and stored in a emitter library and/or a scan strategy library may be input to detection system 102 (e.g., to digital unit data storage 114 and/or system 116) for use during a mission. It should be appreciated that the emitter library and the scan strategy library may be stored in one or more suitable components. For the sake of simplicity, the two libraries are described separately to demonstrate that the emitter library includes information describing emitters (e.g., an manufacturer of the emitter, its model, etc.), a set of parameters of the emitter (e.g., a transmit power, a scan rate, a pulse width, a pulse repetition interval, etc.), as well as potential solutions (i.e., dwell parameters) for the detection of the emitter. During a mission, a system (e.g., an ESM system) may select a most optimal solution from the potential solutions, which may be described as extracting a scan strategy from the information in the emitter library. The scan strategy library may include at least one scan strategy that is executed by the detection system during the mission. A scan strategy may include a number of entries that define one or more dwells used to detect one or more emitters.

Some embodiments of the invention provide a method of computing dwell parameters for digital unit 110 (e.g., an IMOP card) offline, prior to the mission. However, it should be appreciated that embodiments of the invention are not limited in this respect and, in some embodiments, processing of the method may be at least partially performed during a mission. The dwell parameters for each emitter and its operating modes may be determined. Dwells for collecting data specifically for the digital unit may be different from dwells executed to obtain data for analog receiver processing. During the mission, receiver 106 may execute the dwells to detect signals in the environment. Because the dwell parameters are optimized for each of the analyses performed by the digital unit, the data on the detected signals which may then be provided to the digital unit allows optimal utilization of the digital signal processing capabilities of the unit and receiver resources.

As discussed above, any system, either part of or separate from detection system 102 may be used to implement the functionality provided by embodiments of the invention. Known methods for determining dwell parameters for the detection system are not described below in detail for the sake of simplicity. It should however be appreciated that, in embodiments of the invention, dwell parameters for collecting data for efficient utilization of the digital unit are determined along with dwell parameters for processing performed by the conventional receiver. The latter may be determined using any suitable method.

Figure 2:
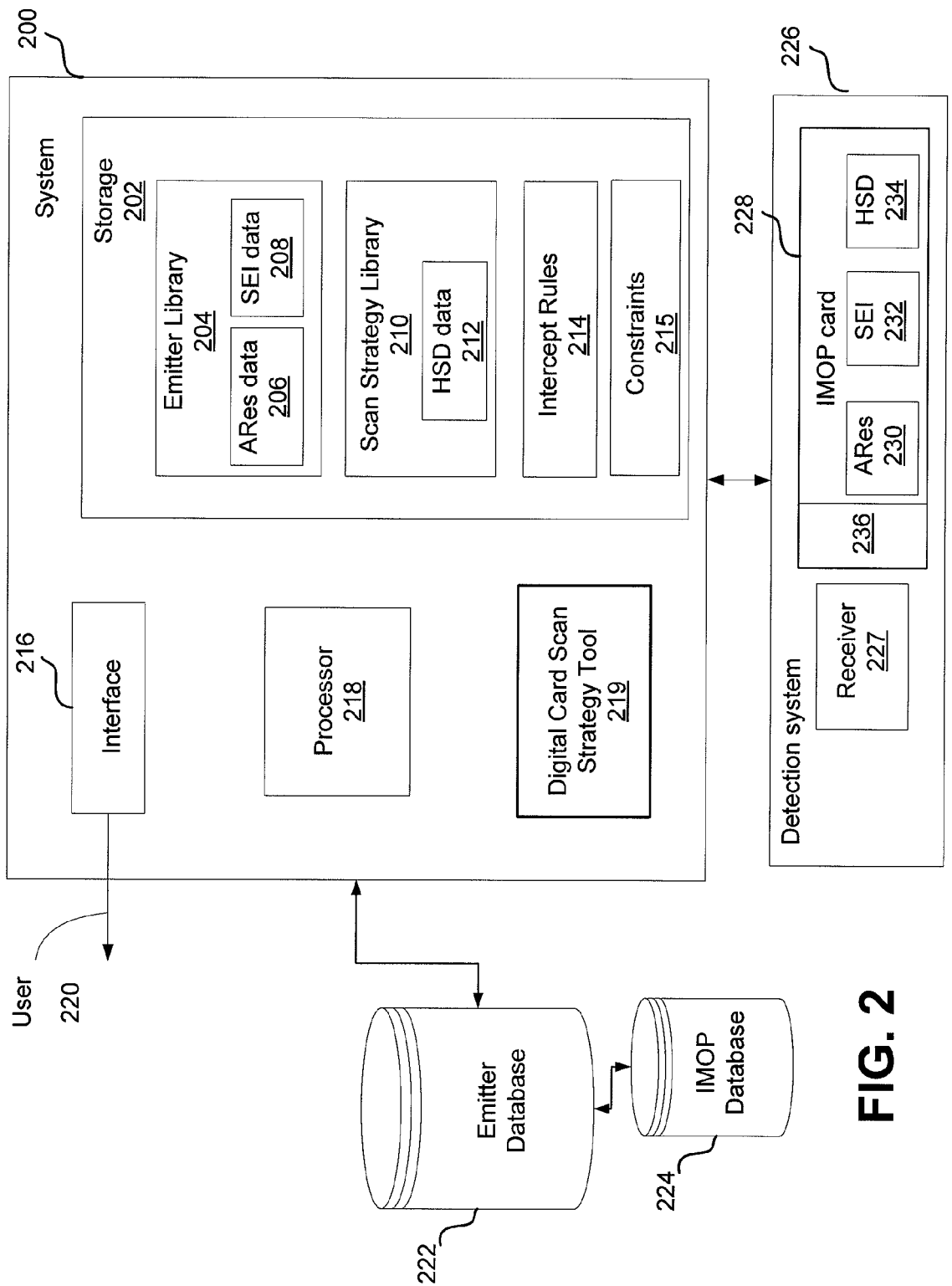
FIG. 2 is a block diagram illustrating a system for determining scan strategies according to some embodiment of the invention.

FIG. 2 shows a system 200 for determining scan strategies according to some embodiments of the invention. The scan strategies may include acquisition scan strategies and analysis scan strategies. It should be appreciated that the analysis scan strategies may be extracted from relevant information during a mission, and the relevant information (e.g., possible dwell solutions for a receiver to detect an emitter) may be determined offline, prior to the mission. The acquisition scan strategies may be determined offline. However, it should be appreciated that the invention is not limited with respect to determining the acquisition scan and analysis scan strategies at any particular time, and the strategies may be determined prior, during a mission or at any other suitable time.

System 200 may be, for example, system 116 or 118 shown in FIG. 1 and is configured to determine the scan strategies to be provided to a detection system for use during a mission. System 200 may include digital card scan strategy tool 219 that determines the scan strategies according to some embodiments of the invention. Digital card scan strategy tool 219 may include software code and any relevant information. In some embodiments, system 200 may be a computer system comprising at least one processor executing digital card scan strategy tool 219. System 200 may provide data to detection system 226 which includes receiver 227.

Detection system 226 is similar to detection system 102 and may be located on any suitable platform. Detection system 226 is configured to receive signals to be detected and identified. These signals may be received by one or more receivers (e.g., receiver 106) and then processed by a processor (e.g., processor 218). In the embodiments illustrated, detection system 226 comprises a digital unit that is, in this example, an IMOP card 228. IMOP card 228 may determine IMOP characteristics of the received signals using digital signal processing techniques. As discussed above, efficient utilization of IMOP card 228 may be achieved by providing the card with the data collected in accordance with characteristics of analyses performed by the card.

IMOP card 228 may include interface 236 to communicate with one or more components (e.g., a receiver) of detection system 228. Interface 236 may provide characteristics of the digital card to system 228. The card may also be controlled (e.g., by a processor of the receiver) via interface 236. It should be appreciated that the invention is not limited to any particular type of a digital unit or analyses performed by the unit as any suitable unit can be substituted.

In one embodiment, the IMOP card may implement at least three types of analyses: ambiguity resolution analysis (ARes) 230, specific emitter identification (SEI) analysis 232, and high sensitivity detection (HSD) analysis 234. The IMOP card may perform the ARes and SEI analyses after a detection of an emitter by a receiver. The detection is typically performed by executing suitable dwells (e.g., acquisition dwells). Analysis dwells may then be built, either automatically or in response to an external request (e.g., a request of a system operator), to collect data for the ARes and SEI analyses, according to some embodiments of the invention. The HSD analysis may allow detection of signals that are not detected by the receiver. In embodiments of the invention, dwells for the HSD analysis are executed as part of an acquisition scan strategy (i.e., these dwells are determined a priori). Each of the analyses may be implemented using at least one algorithm. The algorithm (e.g., a digital signal processing algorithm) may be implemented in software, firmware, hardware or in any suitable combination thereof.

ARes analysis may be required on all intercepted signals to resolve ESM detections and it may be scheduled and performed once after an initial analog detection. This analysis measures pulse parameters that may not be discernable by analog signal processing and provides identification of a type or a class of an emitter. SEI analysis may extend capabilities of the ARes analysis to discriminate between emitters of the same type or class. For example, the SEI analysis may distinguish between signals of the same class or type that differ in their production line serial numbers. This analysis may be performed in response to a request (e.g., made by an operator of an OFP). HSD analysis extends the sensitivity of the analog receiver to detect certain types of emitters that may not be detected by the analog receiver (i.e., the analog receiver is "blind" to these signals).

As discussed above, ARes analysis may be performed once on each signal intercepted by the analog receiver. A number of data samples each comprising a number of pulses required for the analysis may be small, with one data sample being sufficient in some scenarios. The IMOP card implements this function to measure signal characteristics that may not be discernable by the analog receiver. Hence, an emitter whose identification is ambiguous after the analog receiver processing may be unambiguously identified using the IMOP functionality. The analysis dwells for the ARes analysis may be defined as to have a high probability of intercept within an RT which may be different for each emitter and/or emitter operating mode(s). Further, the dwell may be of duration sufficient to satisfy the data collection and processing requirements of the ARes analysis. The dwell for the ARes analysis may differ from the analog receiver dwells with respect to timing requirements. Moreover, the ARes dwell may be terminated once a result is obtained. If no result is obtained within a time period referred to as a timeout, the ARes analysis may be terminated.

The ARes analysis may be referred to as a "one shot" analysis. Since this analysis may be performed on all of the intercepted signals, there may be a large quantity of these "one shot" analysis dwells in the ESM system. Therefore, selecting dwell parameters that optimize the probability of intercept may allow the largest number of analyses to be successfully completed within any unit of time, and may allow the maximum number of concurrent ARes analyses (i.e., due to several analog intercepts) to be active simultaneously. The ARes analysis may be performed automatically.

The SEI analysis is similar to the ARes analysis but may take the emitter identification farther by not only resolving the identification ambiguity, but also discriminating between emitters of the same type. For example, the SEI analysis may provide measurement resolution to distinguish emitters that differ only by their manufacturing serial numbers. Consequently, more data is required to perform this analysis and a larger number of data samples are collected for the analysis. To compensate for the increased number of pulses, the desired intercept rules, particularly a response time, may be adjusted with respect to the available pulses and how they are distributed. For example, if the SEI analysis requires 30 pulses to obtain results while an emitter provides only 10 pulses per main beam, then there may be no meaningful solution for response times less than 2 scan periods, and a more appropriate minimum response time may be some value greater than or equal to 3 scan periods. In some embodiments, the adjustments may be performed automatically.

System 200 includes an associated storage 202 for storing emitter library 204, scan strategy 210, intercept rules 214 and constraints 215. It should be appreciated that storage 202 is shown in FIG. 2 as comprising these components by way of example only and may include any other suitable components. Further, it should be understood that any portion of the data used by system 200 may be stored in any location, either on system 200 or elsewhere. Thus, in embodiments of the invention where system 200 is located separately from detection system 226 (e.g., system 200 is a ground-based computer and detection system 226 is located on an aircraft or on any other platform), information from storage 202 may be provided to the detection system 226. Therefore, detection system 226 may include storage 202 or a similar storage which is not shown in FIG. 2 for the sake of simplicity.

As discussed above, system 200 may have associated interface 216 to communicate with user 220. Interface 216 may comprise, for example, at least one graphical user interface. It should be appreciated that interface 216 may be any suitable interface as embodiments of the invention are not limited in this respect. For example, interface 216 may be a command-line interface. User 220 may view and manipulate information related to operation of digital card scan strategy tool 219 via interface 216. User 220 may also provide input to system 200 to configure the system, define constraints, provide information regarding emitters, or provide any other type of input. In some embodiments, interface 216 may include a control panel which may receive a suitable user input to initiate performance of one or more of the analyses implemented by IMOP card 228. For example, the SEI analysis may be performed upon an operator request. Further, the control panel may be used to manage configuration parameters for the IMOP card.

FIG. 2 shows that system 200 obtains information from a global emitter database 222 that comprises information describing known emitters (e.g., frequency range, antenna type, scanning method used, etc.). Emitter database 222 may be located separately from a platform incorporating system 200 (e.g., platform 100). For example, platform 200 may be associated with an aircraft performing a mission while emitter database 222 may be located in some central location such as a ground-based platform. One or more suitable components of platform 200 (e.g., system 200) may obtain information required for the mission from emitter database 222. Thus, it may be known prior to the mission what emitters are expected in the environment and the respective information on these emitters may be provided to system 200.

It should be appreciated that emitter database 222 may be located in any suitable entity. In some embodiments of the invention, emitter database 222 includes or is otherwise associated with storage for a digital unit shown in FIG. 2 by way of example only as IMOP database 224. This illustrates that an emitter database created using known techniques may be supplemented with additional data used for utilization of digital technology added into or otherwise associated with the conventional receiver. It should be appreciated that IMOP database 224 is shown as a separate component by way of example only and the database 224 can be stored within emitter database 222 or in any other suitable location. IMOP database 224 may include intercept requirements or rules per analysis performed by the digital card to identify each emitter and its operating mode(s). The intercept requirements may be specified by a user or in any other suitable manner. An intercept rule may be defined per emitter mode, the rule determining, for example, Range, probability of intercept, response time, etc. Furthermore, each emitter may be "flagged" in the IMOP database 224 to specify whether a particular analysis (e.g., the HSD analysis) is to be performed on the signals sent by the emitter, as discussed in more detail below. It should be appreciated that the invention is not limited to any particular implementation of the emitter and IMOP databases.

Some embodiments of the invention provide a method of generating emitter database 222 and IMOP database 224. Information from emitter database 222 and IMOP database 224 may be processed as described above and provided to storage 202 that includes emitter library 204, scan strategy 210, intercept rules 214 and constraints 215. It should be appreciated that components 204, 210, 214 and 215 are shown separately by way of example only as embodiments of the invention are not limited in this respect. For example, intercept rules 214 and constraints 215 may be stored within emitter library 204 or in any other suitable component(s).

Prior to a mission (e.g., as part of a mission planning), the information from the databases 222 and 224 may be processed to generate dwell parameters suitable to collect data for analyses implemented by the digital unit. The processing may be implemented, for example, by digital card scan strategy tool 219. Some a priori knowledge of an environment to be scanned during the mission and the emitters expected to operate in the environment is assumed. The dwell parameters may be evaluated using computer simulation techniques and optimized according to results of the simulations. The optimized dwell parameters, along with any other suitable information, may then be stored in any suitable entity. The stored information may be provided to a system (e.g., detection system 226) that performs emitter identification during a mission.

In some embodiments, emitter library 204 includes a number of parameters that describe a particular emitter (e.g., frequency range, antenna type, scanning method used, etc.) An emitter in the library may be "flagged" to indicate that a sensitivity analysis (e.g., the HSD analysis) may be performed for this emitter. The HSD analysis requires specific dwells which are similar to acquisition dwells and are "appended" to an acquisition scan strategy described in more detail below.

Scan strategy library 210 may include a number of entries that define one or more dwells used to scan one or more of the emitters defined in emitter database 222. A dwell may be used to configure a receiver that detects the one or more emitters that the dwell is designed to detect. In embodiments of the invention, executing a dwell means configuring a receiver (e.g., receiver 106) to detect emitted signals within a certain frequency range. As discussed above, dwells may be broadly characterized as acquisition dwells and analysis dwells. Accordingly, a scan strategy may include an acquisition scan strategy and an analysis scan strategy. It is desired to operate a receiver so that receiver configurations are optimally shared between the acquisition scan strategy and the analysis scan strategy.

Constraints 215 may include, for example, constraints of system 200 which may include, for example, processor 218 capability, memory limitations, or any other limitations of hardware and/or software of system 200 that may affect its performance in detecting and identifying signals. Constraints 215 may also include those limitations posed by a user (e.g., limitation to a particular frequency band of interest, removal of a particular emitter type, or other user limitation). In addition, in one embodiment, constraints 215 may include environmental constraints which are characteristics of the environment to be scanned.

In the example illustrated, storage 202 includes intercept rules 215. Intercept rules 214 may comprise, per analysis provided by the digital card (i.e., IMOP card 228) for each emitter and/or emitter operating mode, an intercept rule including a set of parameters such as probability of intercept, Range and response time which may be defined by a user (e.g., an operator) or in any other suitable way. It should be appreciated that intercept rules 214 may be stored as part of emitter library 204 where one or more intercept rules may be associated with an emitter entry. Intercept rules 214 may also be stored in any other suitable component.

As discussed above, embodiments of the invention provide a method of supplementing scan strategies for an analog receiver with scan strategies for a digital card such as an IMOP card. FIG. 2 illustrates that, in some embodiments of the invention, storage 202 comprises information required for collecting data for efficient operation of IMOP card 228. Scan strategies may be generated specifically for IMOP card 228. Thus, emitter library 204 which comprises emitter information required for the analog receiver (e.g., receiver 227) also includes ARes and SEI requirements for collecting data to be used as input to ARes analysis 230 and SEI analysis 234, respectively. Storage components for the analyses are labeled for the representation purposes only as ARes data 206 and SEI data 208. Components 206 and 208 may store dwell solutions for the data collection to provide input to the analyses. When receiver 227 is in operation, dwells for ARes and SEI analyses for the emitter may be built on a fly, using the information stored in components 206 and 208. It should be appreciated that the ARes data 206 and SEI data 208 components are shown within emitter library 204 by way of example only and may be located in any suitable location within or outside storage 202.

FIG. 2 illustrates that, in some embodiments of the invention, scan strategy 210 includes HSD data 212 which comprises dwell characteristics suitable to collect data for the HSD analysis 234. The dwell characteristics are stored as part of the acquisition scan strategy. An emitter may be "flagged" in emitter database 222 to indicate that the HSD analysis may be performed for this emitter and that a scan strategy to collect data for the analysis may be determined. It should be appreciated that HSD data 212 component is shown within scan strategy library 210 by way of example only to indicate that dwells for the HSD analysis which are similar to acquisition dwells are of a specific type and are added to existing scan strategies for the analog receiver.

As discussed above, a digital card inserted or other wise associated with an analog receiver may implement a set of digital signal processing functions providing functionality (e.g., an IMOP) of the card. The functionality may be realized by a set of algorithms. Some embodiments of the invention provide digital card scan strategy tool 219 that implements a method of determining dwell characteristics to configure the receiver for collecting data for the digital card. In some embodiments, the tool may be part of BSTGen™ software developed by the Lockheed Martin Corporation. The dwell characteristics are defined based on requirements of the algorithms implemented by the card. For example, for an IMOP card, the dwell characteristics are defined according to requirements of the ARes, SEI and HSD analyses. The dwell characteristics are evaluated using intercept rules (e.g., probability of intercept, response time, and Range.) and stored in one or more databases (e.g., emitter library 204 and scan strategy library 208). The dwell characteristics may be adjusted based on the evaluation.

Figure 3:
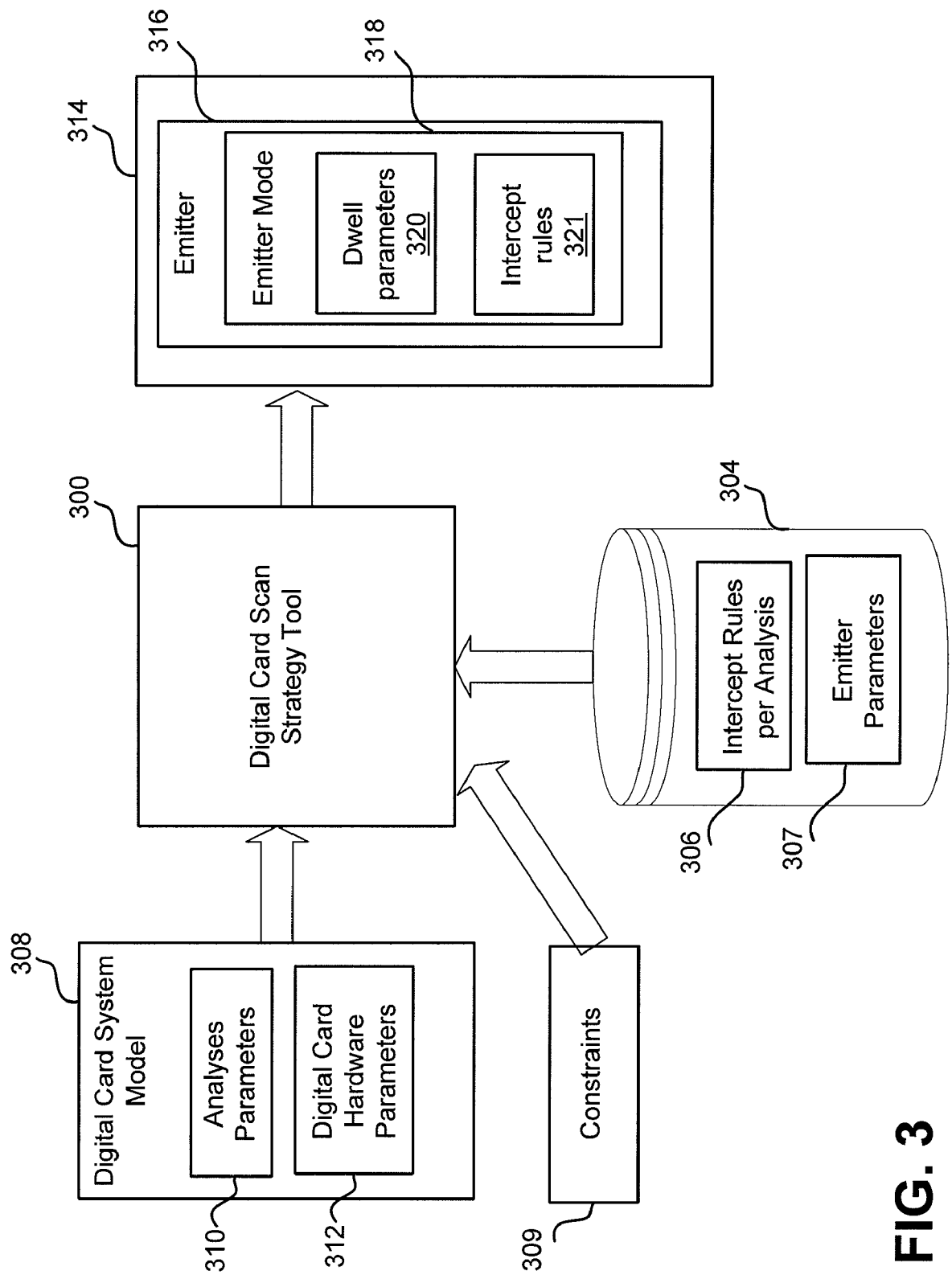
FIG. 3 in a conceptual illustration of inputs and outputs of a digital card scan strategy tool, according to some embodiments of the invention.

FIG. 3 conceptually illustrates inputs and outputs of a digital card scan strategy tool 300 provided by some embodiments of the invention. The tool may be identical to tool 219 shown in FIG. 2 and may be implemented in any suitable way (e.g., in software code in system 200). In some embodiments, the tool may be incorporated into the BSTGen™ software. Thus, the tool uses analyses parameters 310 and digital card hardware parameters 312 provided by digital card system model 308. Analyses parameters 310 may comprise requirements of the ARes, SEI and HSD analyses. For example, a number of data samples required to perform each analysis may be included.

Tool 300 utilizes intercept rules per analysis 306 and emitter parameters 307 provided by a global emitter database 304 (e.g., emitter database 120 or 222). Tool 300 may also accept constraints 309 such as, for example, environment constraints. Intercept rules per 306 may be adjusted, as described below. It should be appreciated that the intercept rules are defined per analysis implemented in the digital card for each emitter operating mode when an emitter operates is more than one modes. The tool 300 processes the analysis parameters and digital card hardware parameters to define and evaluate dwell characteristics, according to the intercept rules. As a result, output data is generated and stored, for example, in an emitter library 314. The output data comprises, for each emitter operating mode 318 of emitter 316, parameters defining timing of data collection for each of the analyses performed by the digital card (e.g., ARes, SEI and HSD analyses of the IMOP card). In FIG. 3, the parameters comprise dwell parameters 320. Intercept rules 321 may also be stored in emitter library 314. Intercept rules 321 may be adjusted intercept rules 306. The dwell parameters 320 include dwell sampling durations, dwell sampling rates, timeouts (e.g., interim and cancellation timeouts), etc. The parameters allow, given some expectations as to signals in the environment, determination of sampling rates to efficiently collect signals of interest. For example, more resources may be dedicated to signals that are more desired to be detected or more difficult to detect. Also, resources may be provided to collect rare and low power signals.

ELINT and ESM receivers employ a scan strategy to scan the frequency spectrum for signals of interest. This scan strategy comprises a set of dwells, which define for how long energy is sampled in a portion of the frequency spectrum, and how often that portion of the frequency spectrum should be sampled. These are referred to as Dwell Duration (DD) and dwell Revisit Time (RVT) respectively. Dwell Duration may be further subdivided into two time intervals, Minimum Dwell Duration (MDT) and Extended Dwell Duration (EDT). A value of MDT defines the shortest time period spent for a given dwell, while a value of EDT defines the maximum amount of time spent for the given dwell. The actual time spent ranges between these two limits and may be a function of a signal density in the sampled portion of the spectrum.

In some embodiments of the invention, other parameters such as gain adjustment and timeouts may be defined for data collection to provide inputs to analyses performed by the digital card. For example, a timeout parameter may be defined to stop data collection when required data is not obtained within the timeout time period. Interim timeouts may be determined when more than one data sample may be required for an analysis. The gain adjustment may define analysis sensitivity, as described below.

Figure 4:
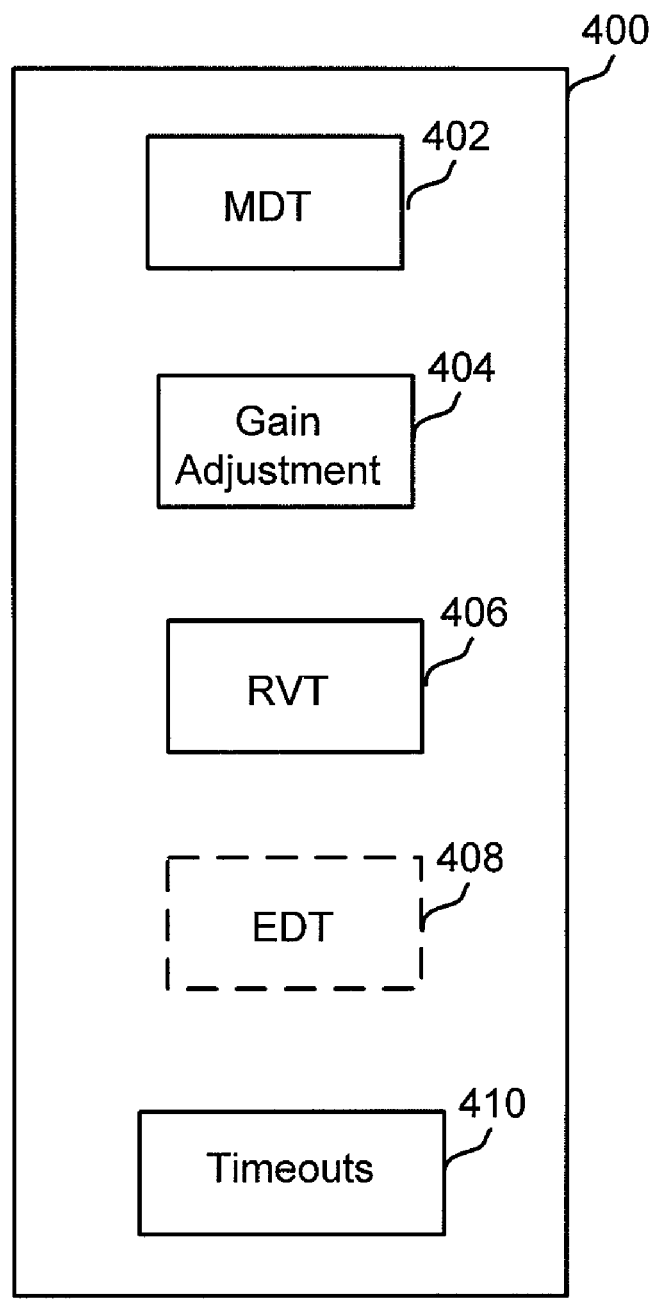
FIG. 4 illustrates dwell parameters for collecting data for a digital unit, according to some embodiments of the invention.

FIG. 4 shows, by way of example, dwell parameters 400 determined in some embodiments of the invention. The parameters may be determined, for example, by the digital card scan strategy tool 300. It should be appreciated that one or more of parameters 400 may be determined for each of the analyses performed by the digital card (e.g., ARes, SEI and HSD analyses of the IMOP card). Parameters 400 may include minimum dwell duration 404, Gain Adjustment 404, revisit time 406, extended dwell duration 408 and timeouts 410. It should be appreciated that more than one value of each of the parameters 400 may be computed (e.g., for different receiver configurations), as discussed below. Further, other parameters may be computed as well. EDT 408 is shown by a dashed line because it is not required for the HSD analysis. Parameters 400 are described in more detail below.

Figure 5:
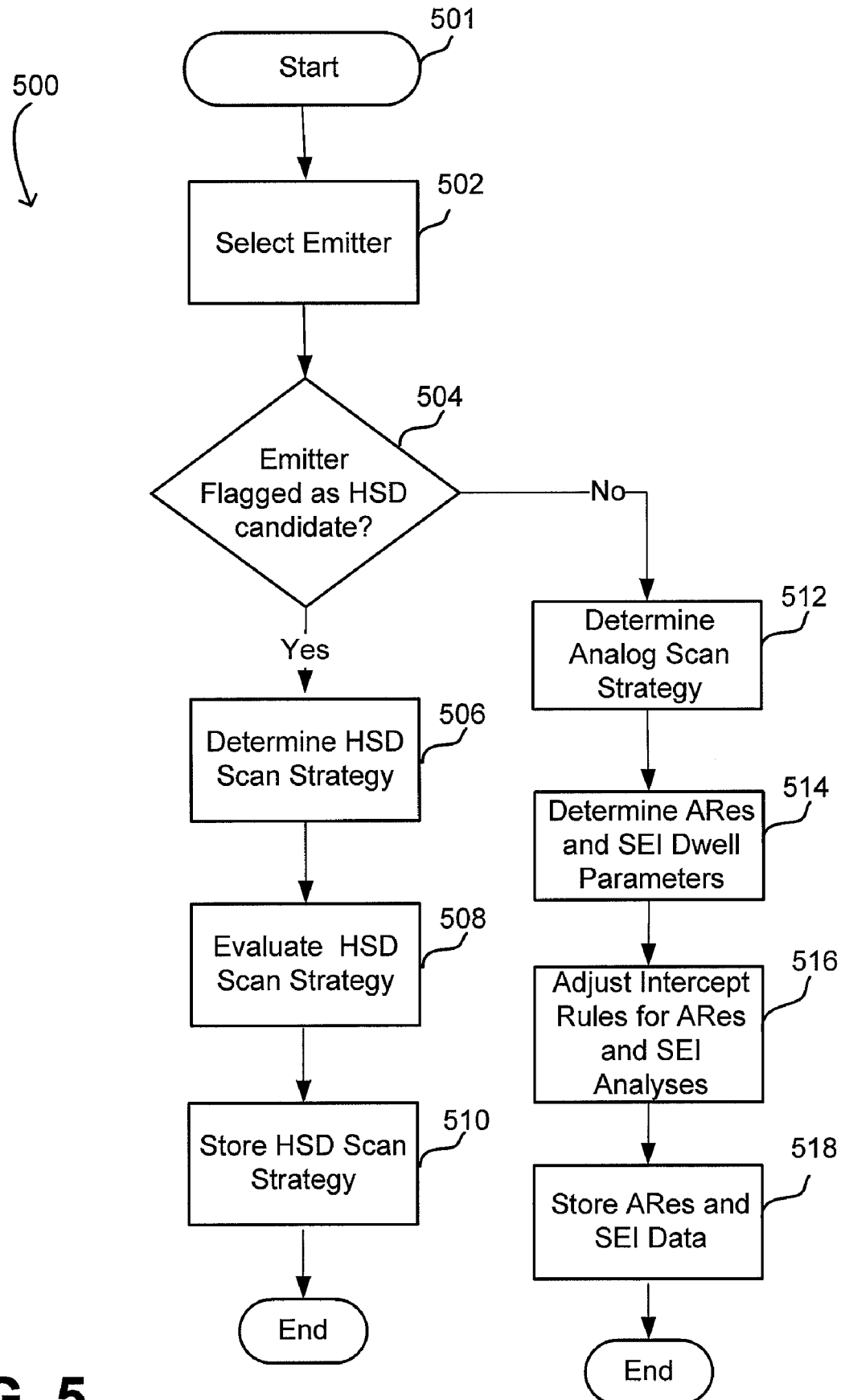
FIG. 5 is a flowchart illustrating a process for determining dwell parameters to collect data for a digital unit, according to some embodiments of the invention.

Some embodiments of the invention provide a method of determining optimal parameters for dwells executed to collect data for a digital card operating in association with an analog receiver. The method may be implemented, for example, as software code or in any suitable combination of software, hardware and firmware parameters. FIG. 5 shows a process 500 for determining dwell parameters to collect data for the digital unit, according to some embodiments of the invention. The digital unit may be, for example, an IMOP card. The process 500 may be implemented, for example, in digital card scan strategy tool 300 shown in FIG. 3. It should be appreciated that the digital card scan strategy tool may comprise any suitable data processing techniques for determining and evaluating suitable scan strategy for a digital unit operating in association with an analog receiver. The techniques may be implemented using computer simulations, manually or in any other suitable way.

At block 501, process 500 begins. At block 502, a list of the emitters of interest for which a solution is determined may be selected. For each emitter operating mode, one or more intercept rule may be defined (e.g., by a user) per analysis. According to some embodiment of the invention, an intercept rule may include such parameters as Range, probability of intercept and response time. Dwell parameters are also defined for an emitter and/or per emitter operating mode. The dwell parameters and intercept rules may be stored in any suitable emitter database.

As discussed above, dwell parameters associated with each emitter of interest and intercept rules defined to detect the emitter may be provided to a system (e.g., system 200). The system may evaluate (e.g., using a digital card scan strategy tool) the dwell parameters and adjust the intercept rules so that the parameters allow collecting required data. Mathematical modeling techniques may use used for this purpose. In addition, constraints may be defined to the system.

Emitters of interests may be categorized (e.g., "flagged" in a database such as a global emitter database) as HSD or non-HSD emitters. The Non-HSD emitters may be detected using standard acquisition dwells built to satisfy the intercept requirements and capabilities of the host receiver. Information on the HSD emitters may be processed independently, using similar processing with some modifications.

In a decision block 504, it may be determined whether an emitter is "flagged" as a candidate for the HSD analysis. As discussed above, emitters may be "flagged" as such candidates in a global emitter database (e.g., databases 120 and 222). Dwell parameters to collect data for the HSD analysis may be generated for an emitter "flagged" as the HSD candidate.

If it is determined, in decision block 504, that the emitter is not "flagged" as an HSD candidate, the process branches to block 512 where scan strategy 512 for an analog receiver (e.g., acquisition scan strategy) may be determined. It should be appreciated that the scan strategy for intercepting signals by the analog receiver may be computed simultaneously with and independently from the process of determining and evaluating dwell characteristics for collecting data for the digital card. The computation of the dwells parameters for the digital card may be performed in any order and relation to the computation of dwells for the analog receiver since embodiments of the invention are not limited in this respect.

In block 514, ARes and SEI dwell parameters may be determined. Information used for determining the parameters may be obtained, for example, from a global emitter database. The information may include transmission characteristics of the emitter selected in block 502 and intercept rules requirements for each of the analyses. Then, given some environmental constraints, the dwell parameters may be computed, for example, as information reports comprising timing requirements for each of the analyses. The computation may be performed using computer simulations where any computer system may be used to run the simulations. Any other suitable method may be used since embodiments of the invention are not limited in this respect. The information reports may include data required to define ARes and SEI analyses dwells on a per emitter mode basis. The reports may then be processed, in block 516, to adjust intercept rules defined for each analysis to thus tune the dwell parameters.

In some embodiments, dwell parameters for collecting data for the ARes analysis include MDT and EDT. MDT may be defined as ($PRI_{max}$+Pulse_width$_{max}$), where PRI is a Pulse Repetition Interval, $PRI_{max}$ is a maximum expected RPI value, and Pulse_width$_{max}$ defines maximum expected pulse width coverage. Extended dwell duration may be defined as (($K \times PRI_{max}$)+Pulse_width$_{max}$), where K is a constant representing a number of pulses required for the data collection sample. In some embodiments, K may be equal to 2 for the ARes analysis. It should be appreciated that embodiments of the invention are not limited in this respect and other values for the constant K may be substituted.

In some embodiments, emitter transmit power, antenna parameters and scan characteristics of a receiver, and other suitable parameters may be used to define power of emitter signals that may be received at receiver's one or more antennas. Any suitable method known to a person of skill in the art may be used to calculate the power. For example, a radar range equation for an Omni-receive antenna may be used. The computed power may be used to determine intercept rules for the analyses to be performed on signals sent by the emitter. An intercept rule for the ARes analysis to be performed on the selected emitter may include probability of intercept, Range and response time. Other suitable parameters may be included as well. In some embodiments of the invention, it may be determined whether the selected emitter is detectable at the range Range. Further, it may be determined whether a sensitivity of receiver is sufficient to detect signals from the emitter.

If the emitter is not detectable at a range defined as a Range value, then the Range parameter may be reduced. If the emitter presenting multiple illumination times to a receiver may be detected at the range, a "time in beam" (TIB) parameter may be computed which is the expected duration of each "paint" or illumination representing a pass that the emitter makes across a search volume.

The analysis sampling period, or revisit time, may then be computed using the following equation, which may vary by scan type:

$$RVT = (TIB - MDT - EDT)\left(1 - \frac{N}{\mathrm{Ln}(1 - Pd)}\right) \quad \text{Equation 1}$$

Where N represents a number of intercept opportunities (e.g., expected radar "paints") within a response time response time, probability of intercept Pd is the desired probability of intercept and TIB is the expected duration of each "paint" or illumination. N may be computed as an integer number of scans within response time. Also, N may be larger than the number of scans within response time when multiple "paint" opportunities exist within on scan period.

The revisit time revisit time defines a sampling rate required to acquire data within response time with a probability of at least probability of intercept. As discussed above, it is desired that probability of intercept be a maximum possible probability of intercept. Therefore, the dwell parameters may be selected to maximize the probability of intercept. The evaluation is performed, using any suitable computing method, to determine whether the emitter may be detected when the defined dwell parameters are used. Probability of intercept and other intercept parameters may then be adjusted if the selected dwell parameters may not provide data required for a successful performance of the analysis.

In embodiments where the emitter emits non-scanning (i.e., steady) signals, RVT may be set to a large fraction (e.g., 0.6-0.9) of the response time response time to ensure a timely detection of the emitter signals. Setting the fraction may, for example, decrease the impact of dwell scheduling noise (e.g., timing jitter) that may exist within the receiver.

The time in beam parameter may be a function of receiver sensitivity. The sensitivity may depend on a receiver bandwidth configuration (e.g., IF/VBW). For the IMOP analyses, such receiver bandwidth configurations as Wide/Wide, Narrow/Wide and Narrow/Medium may be available. A configuration that is the most sensitive one may be selected to define TIB. This configuration satisfies the emitter's minimum pulse width detection requirement (e.g., a wider VBW) and the emitter's signal bandwidth (e.g., IF bandwidth). In some embodiments, TIB for more than one possible receiver bandwidth configuration may be computed. As a result, multiple RVT values may be determined. Then, during the operation of a receiver scanning an environment, a suitable component of the receiver (e.g., an Operation Flight Program (OFP)) may select an appropriate RVT for a certain receiver bandwidth configuration based on emitter measurements at a time of initial intercept and subsequent data collection. In one embodiment, a default receiver bandwidth configuration may be set for the receiver.

In some scenarios, computed RVT and TIB may not be appropriate (e.g., their duration may be too short) to support the ARes (and other) IMOP analysis. In other words, a successful ARes analysis may not be possible under given environmental constraints. For example, the TIB duration may not provide the minimum number of pulses required for the IMOP analysis sample, or the RVT may be too small for the receiver to timely execute respective dwell(s). In such scenarios, the range parameter (Range) of the intercept rule may be reduced. This may be achieved by incrementally reducing the receiver sensitivity (e.g., analysis channel sensitivity) until desired (e.g., sufficiently large) TIB and RVT values are obtained. The sensitivity may be stored as the Gain Adjustment value for the emitter. It should be appreciated that embodiments of the invention are not limited to any particular digital unit used as units other than IMOP cards may be substituted. The described adjustment of the Range parameter may be performed for any suitable digital unit to tune the sampling rate of the receiver to efficiently collect data in accordance with requirements of analyses performed by the digital unit.

In embodiments where the IMOP card is utilized, the Range parameter may be configured based on expected amplitude (e.g., a peak amplitude) of the intercepted signal. If the selected Range does not allow collecting data as desired (e.g., using a desired sampling rate), the Range parameter may be reduced and set below the expected peak amplitude. The Gain Adjustment parameter may reflect this change. Thus, enough lower power data may be available to collect data for the ARes analysis. The RVT parameter may also be tuned manually, by an operator of the system (e.g., system 200).

The MDT, EDT, and RVT parameters define the timing that may provide the optimal sampling under given conditions of an intercept environment. The conditions may include, for example, emitter transmit power and other parameters. Once the sampling is initiated, it continues until an IMOP analysis such as a set of algorithms for the ARes analysis is successfully performed. However, if the analysis may not be performed, a timeout may be used to terminate operation of the receiver to collect data for the analysis. This may occur, for example, when the conditions of the intercept environment are not satisfactory (e.g., an emitter range is beyond the Range parameter defined in the intercept rule or when the emitter is shut down. The timeout parameter may be computed as follows:

$$\text{Timeout} = SP\left(1 - \frac{RVT}{TIB} \times \text{Lag\_lead}\right)\text{Ln}(1 - Pd_F) \quad \text{Equation 2}$$

Where Lag_lead is an estimate of receiver scan loading (typically $0.8<LL<1.3$), and $Pd_f$ is the probability that the emitter is present and radiates signals, but was not detected during the timeout period. For example, if $Pd_f$ is set to 0.01 and no detection was made during the timeout period, then there is a 1% chance that the emitter is still present and radiating. However, the desired probability of intercept of 0.99 may not be achieved and the analysis can be terminated to free up resources to analyze other emitters. The terminated analysis attempt may be re-scheduled for a future attempt by the system. If the emitter radiates non-scanning signals, the timeout may be set to a multiple of response time to meet a similar confidence that it is reasonable to terminate an analysis attempt. Dwell parameters computed for the ARes analysis as described above may be saved in an emitter library. At this point, the emitter's ARes dwell timing parameters may be saved within the emitter library for use by the OFP.

In some embodiments, dwell parameters for collecting data for the SEI analysis include RVT, MDT, EDT, timeouts and Gain Adjustment parameters. In addition, interim timeouts and a number of analysis data samples may be defined to collect data for the SEI analysis. Successful execution of the SEI analysis requires data collected over a certain number of data samples, while the ARes analysis may be expected to provide results with one data sample. While the Range parameter may be adaptively adjusted for both the ARes and SEI analysis, the response time parameter may be adjusted for the SEI analysis data collection to ensure the data collection can be made in one or more consecutive samples.

In some embodiments, after an achievable TIB is determined, a percentage of the TIB value (TIB_Reserve_Thr) may be reserved for the data collection for the SEI analysis. At this point, the EDT may not yet be known, and a number of pulses required for a successful SEI analysis (SEI_Pulse_Count), may be large. Therefore, multiple collections may be required to collect data:

$$RVT = TIB(1 - \text{TIB\_Reserve\_Thr})\left(1 - \frac{N}{\text{Ln}(1 - Pd)}\right) \quad \text{Equation 3}$$

The number of pulses available per data sample may be defined as follows:

$$\text{Pulses} = \text{Min}\left[\frac{TIB \times \text{TIB\_Reserve\_Thr}}{PRI_{Max}} - 1, \text{SEI\_Pulse\_Count}\right] \quad \text{Equation 4}$$

In embodiments where an emitter radiates a continuous wave (CW) signal that has no pulses, it may be assumed that the receiver may "chop" the continuous waveform to synthesize pulses. In such scenarios, a "chop" interval may define $PRI_{max}$ and SEI_Pulse_Count may be defined as a signal observation time divided by the "chop" interval ($SEI\_CW\_EDT/PRI_{max}$).

In one embodiment, the required number of SEI pulses (SEI_Pulse_Count) may be a function of a minimum pulse width. EDT and the expected number of samples (Number_Samples) may respectively be defined as follows:

$$EDT = \text{Min}[PW + PRI_{Max} \times (\text{Pulses} - 1), \text{HW\_Time\_Limit}] \quad \text{Equation 5}$$

$$\text{Number\_Samples} = \frac{\text{SEI\_Pulse\_Count}}{1 + \frac{EDT - PW}{PRI_{Max}}} \quad \text{Equation 6}$$

If one data sample is sufficient to complete the SEI analysis, RVT, and timeouts may be computed. Otherwise, the response time and probability of intercept parameters may be adjusted to collect a number of data samples for analysis. In embodiments of the invention, the intercept rule for the analysis including the response time, probability of intercept and Range parameters may be defined before evaluation of the dwell parameters defined to detect the emitter.

As discussed above, to perform the SEI analysis successfully, multiple data samples may be required to satisfy the collection of the number of pulses equal to SEI_Pulse_Count. For continuous wave scenarios, SEI_CW_EDT of data observation time may need to be satisfied.

When more than one data sample is required to collect data for a successful SEI analysis, the intercept rule for the analysis, which is defined per each emitter operating mode, may be adjusted. For example, a minimum sample response time may be defined to be at least equal to one scan period, and probability of intercept may be "boosted" such that the overall probability of intercept can be met for the total analysis duration across all the samples. Therefore, a suitable RVT may be determined for the SEI analysis to be successfully completed after a defined number of sample collections, in accordance with the initially set probability of intercept. In other words, probability of intercept may be adjusted as:

$$Pd = Pd^{\frac{1}{\text{Number\_Samples}}} \quad \text{Equation 7}$$

For scanning emitter signals, the response time may be adjusted as follows:

$$\text{Response\_Time} = \frac{\text{Response\_Time}}{\text{Min}\left[\text{Number\_Samples}, \frac{\text{Response\_Time}}{\text{Scan\_Period}}\right]} \quad \text{Equation 8}$$

For non-scanning emitter signals, the response time may be adjusted as follows:

$$\text{Response\_Time} = \frac{\text{Response\_Time}}{\text{Number\_Samples}} \quad \text{Equation 9}$$

Sampling rates for collecting data for the SEI analysis may thus be adjusted by adjusting probability of intercept and response time as defined in Equations 7-9. Interim Timeout may be computed using Equation 2. Timeout may then be equal to (Number_Samples×Interim Timeout). During operation of the receiver, a component controlling dwell execution (e.g., the OFP) may use the timeouts to terminate the SEI analysis when the required data cannot be collected within a predetermined time. When data samples are collected, but the time it takes to receive a next sample exceeds the interim timeout, the SEI analysis may be terminated. Further, if data samples are collected, within the interim timeout period, but the total time elapsed since the data collection for the analysis has been initiated exceeds Timeout, the SEI analysis may be terminated.

Upon adjusting intercept rule parameters and tuning dwell parameters in block 516 of FIG. 5 as described above, the obtained information referred to as ARes and SEI data may be inserted into an emitter library (e.g., into components 206 and 208 of emitter library 204 of system 200) and stored for a later use by a detection system. The detection system (e.g., via the OFP) may access the data to execute analysis dwells for the IMOP card given intercept conditions of the scanned environment.

During operation of the host receiver, analysis dwells may then be built on the fly. Upon exiting block 518, process 500 may end. However, it should be appreciated that process 500 may be performed for each emitter of interest and therefore returns to block 502. It should also be appreciated that the scan strategy for the HSD analysis may be determined after the process branches to block 512 and determines analog scan strategy and data for the ARes and SEI analyses.

If it is determined, in block 504, that the emitter is "flagged" as an HSD emitter or an HSD candidate, the process branches to block 506 where a scan strategy for the HSD analysis is determined. The scan strategy may be determined per each emitter operating mode when the emitter has more than one operating mode. In some embodiments, if an emitter is an HSD candidate, then only "HSD dwells" (e.g., dwell parameters suitable to collect data for the HSD analysis) may be built for it. Dwell parameters for the SEI or ARes analyses may not be computed. The HSD dwells may be executed along with the acquisition dwells for an analog receiver. In other embodiments, the dwell parameters for the SEI or ARes analyses may be determined as well.

As discussed above, the HSD analysis provides digital signal processing algorithms that allow detection and processing of signals radiated by an emitter that the host receiver (i.e., the receiver of the detection system) may not detect. This may provide enhanced emitter detection of low power signals. Dwell parameters to be executed to collect data for the HSD analysis may be assigned the widest intermediate frequency (IF) and video bandwidths, and may be appended to the analog acquisition scan strategy. A pre-determined dwell duration time may be used. The "HSD dwells" may be added to the analog acquisition scan strategy and executed a priori.

To perform a successful HSD analysis, dwell parameters are determined for the HSD analysis to be executed along with the receiver's acquisition scan strategy. In some embodiments, signal transmission characteristics of the emitter, the receiver sensitivity, HSD_Gain, and intercept rules may be used to compute TIB and then RVT using, for example, Equation 1. For the HSD analysis, EDT may be set to zero and MDT may be set to a constant value because the receiver does not perceive pulses for the HSD analysis in real time. The constant may be, for example, HSD_Segment_Duration, which may be defined as the maximum time that one or more digital HSD processing algorithms require to integrate the signals from a background noise.

In block 508, the HSD scan strategy comprising the dwell parameters may be evaluated. The evaluation process assesses the performance of the scan strategy given some environment constraints. The evaluation may be performed using computer simulation or in any other suitable manner. The evaluation may result in adjusting the HSD scan strategy and/or other related parameters. For example, intercept rules for the HSD analysis may be adjusted (e.g., manually, automatically, or in any suitable combination thereof). Further, some adjustments to a set of algorithms implementing the HSD analysis may be made. The thus evaluated scan strategy for the HSD analysis may then be stored, for example, in scan strategy components 210 of storage 202 shown in FIG. 2. Process 500 may then end. However, it should be appreciated that process 500 may be performed for each emitter of interest and therefore returns to block 502.

It should be appreciated that the ARes, SEI and HSD analyses performed by the IMOP card inserted into a receiver of a system are described by way of example only and any suitable digital unit may be substituted. Such a unit may be used as a "black box" implementing a plurality of digital signal processing algorithms or other algorithms extending functionality of the system. If input and output data requirements and constraints for these algorithms may be obtained, timing parameters (e.g., dwell parameters) to be executed to collect data for the algorithms may be determined using embodiments of the invention.

Further, the digital unit or any other suitable component implementing a plurality of digital signal processing algorithms may not be inserted into a receiver of a system and may be located in any suitable component (e.g., a processor) of the system.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, embodiments of the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for determining a scan strategy for allocating resources of an electronic support measure receiver in a system employing at least one digital signal processing algorithm to identify at least one emitter, the method comprising:
    obtaining at least one intercept requirement for the at least one digital signal processing algorithm;
    determining at least one scan strategy based at least in part on the at least one intercept requirement to receive electromagnetic signals from the at least one emitter for input to the at least one digital signal processing algorithm;
    adjusting the at least one intercept requirement to provide at least one tuned scan strategy so that the at least one digital signal processing algorithm can be successfully executed on the electromagnetic signals received using the at least one tuned scan strategy; and
    storing the at least one tuned scan strategy.

2. The method of claim 1, wherein the at least one digital processing algorithm is implemented for an Intentional Modulation on Pulse (IMOP) analysis.

3. The method of claim 2, wherein the Intentional Modulation on Pulse (IMOP) analysis comprises at least one of an ambiguity resolution (ARes) analysis, a specific emitter identification (SEI) analysis, and a high sensitivity detection (HSD) analysis.

4. The method of claim 1, wherein the at least one intercept requirement comprises at least one intercept rule including at least one of a probability of a detection of the at least one emitter, a range at which the at least one emitter is detected and a response time within which the electromagnetic signals are received for the at least one digital signal processing algorithm.

5. The method of claim 1, wherein the at least one digital signal processing algorithm is implemented in a digital unit associated with the electronic support measure receiver.

6. The method of claim 1, wherein the stored at least one scan strategy is used by an operation flight program of the system.

7. The method of claim 1, wherein the at least one scan strategy is stored in an emitter identification library.

8. The method of claim 1, wherein the at least one scan strategy comprises a plurality of analysis dwell parameters for at least one receiver configuration.

9. The method of claim 1, wherein the plurality of analysis dwell parameters comprises a sampling rate.

10. The method of claim 1, wherein the plurality of analysis dwell parameters comprises at least one timeout value.

11. A computer-readable medium encoded with computer-executable instructions that, when executed by a computer, instruct the computer to perform a method for determining a scan strategy for allocating resources of an electronic support measure receiver in a system employing at least one digital signal processing algorithm to identify at least one emitter, the method comprising:
    obtaining at least one intercept requirement for the at least one digital signal processing algorithm;
    determining at least one scan strategy based at least in part on the at least one intercept requirement to receive electromagnetic signals from the at least one emitter for input to the at least one digital signal processing algorithm;

adjusting the at least one intercept requirement to provide at least one tuned scan strategy so that the at least one digital signal processing algorithm can be successfully executed on the electromagnetic signals received using the at least one tuned scan strategy; and storing the at least one tuned scan strategy.

12. The computer-readable medium of claim 11, wherein the at least one intercept requirement is specified by a user.

13. The computer-readable medium of claim 11, wherein the at least one scan strategy is determined so that a duration of time to receive the electromagnetic signals is minimized.

14. The computer-readable medium of claim 11, wherein the at least one digital signal processing algorithm is implemented in a digital unit.

15. The computer-readable medium of claim 11, wherein the at least one intercept requirement comprises at least one intercept rule including at least one of a probability of a detection of the at least one emitter, a range at which the at least one emitter is detected and a response time within which the electromagnetic signals are received for the at least one digital signal processing algorithm.

16. A system for determining a scan strategy for receiving signals from a surrounding environment by an electronic support measure receiver for input to at least one digital signal processing algorithm to identify at least one emitter, the system comprising:

a processing module for performing a method of:

obtaining at least one intercept requirement for the at least one digital signal processing algorithm;

determining at least one scan strategy based at least in part on the at least one intercept requirement to receive electromagnetic signals from the at least one emitter for input to the at least one digital signal processing algorithm;

adjusting the at least one intercept requirement to provide at least one tuned scan strategy so that the at least one digital signal processing algorithm can be successfully executed on the electromagnetic signals received using the at least one tuned scan strategy; and storing the at least one tuned scan strategy.

17. The system of claim 16, wherein the at least one digital processing algorithm is implemented for an Intentional Modulation on Pulse analysis.

18. The system of claim 17, wherein the Intentional Modulation on Pulse analysis comprises at least one of a first analysis that identifies a type of the at least one emitter, a second analysis that discriminates between at least two emitters of a same type, and a third analysis that has a sensitivity higher than a sensitivity of the electronic support measure receiver.

19. The system of claim 16, wherein the at least one intercept requirement comprises at least one intercept rule including at least one of a probability of a detection of the at least one emitter, a range at which the at least one emitter is detected and a response time within which the electromagnetic signals are received for the at least one digital signal processing algorithm.

20. The system of claim 19, wherein adjusting the at least one intercept requirement is performed so that a duration of time to receive the electromagnetic signals is minimized.

* * * * *